(12) United States Patent
Howe

(10) Patent No.: US 6,922,465 B1
(45) Date of Patent: Jul. 26, 2005

(54) METHOD AND SYSTEM FOR REPORTING EVENTS IN TELECOMMUNICATION NETWORKS

(75) Inventor: Walter Wesley Howe, Alpharetta, GA (US)

(73) Assignee: GTE Mobilnet Incorporated, New York, NY (US)

( * ) Notice: Subject to any disclaimer, the term of this patent is extended or adjusted under 35 U.S.C. 154(b) by 0 days.

(21) Appl. No.: 09/418,436

(22) Filed: Oct. 14, 1999

(51) Int. Cl.[7] ............................................... H04M 1/64
(52) U.S. Cl. ................ 379/76; 379/213.01; 379/207.05
(58) Field of Search ......................... 379/88.22, 201.01, 379/201.02, 114.29, 76, 207.05, 213.01; 455/458, 417, 528

(56) References Cited

U.S. PATENT DOCUMENTS

| | | | |
|---|---|---|---|
| 4,191,860 A | 3/1980 | Weber ....................... 179/18 B |
| 4,756,020 A | 7/1988 | Fodale ........................ 379/112 |
| 5,353,331 A | 10/1994 | Emery et al. .................. 379/58 |
| 5,440,615 A * | 8/1995 | Caccuro et al. ........... 379/88.06 |
| 5,506,887 A | 4/1996 | Emery et al. .................. 379/58 |
| 5,574,904 A | 11/1996 | Yunoki et al. ............... 395/601 |
| 5,583,920 A * | 12/1996 | Wheeler, Jr. ............ 379/114.29 |
| 5,610,972 A | 3/1997 | Emery et al. .................. 379/58 |
| 5,664,005 A | 9/1997 | Emery et al. ................ 455/422 |
| 5,758,281 A | 5/1998 | Emery et al. ................ 455/428 |
| 6,088,429 A * | 7/2000 | Garcia, deceased ........ 379/67.1 |
| 6,327,363 B1 * | 12/2001 | Henderson et al. .... 379/265.01 |
| 6,535,596 B1 * | 3/2003 | Frey et al. ............. 379/201.07 |

* cited by examiner

*Primary Examiner*—Fan Tsang
*Assistant Examiner*—Olisa Anwah
(74) *Attorney, Agent, or Firm*—Leonard C. Suchtya, Esq.; Joel Wall, Esq.; Finnegan, Henderson, Faranow et al

(57) ABSTRACT

Methods and systems are provided for reporting to subscribers network events in a plurality of formats and languages depending upon the particular subscriber group to which a subscriber belongs. When a subscriber requests a call, a switching node in the network invokes a trigger that identifies a signaling node for routing the call and sends a route request to the signaling node. While processing the route request, if the signaling node detects an event that would prevent the call from being routed, the signaling node identifies the subscriber group of the subscriber and determines a directory number associated with the identified subscriber group and the detected event. The signaling node then returns the determined directory number to the switching node. Using the determined directory number, the switching node establishes the call to a message node, where a message associated with the determined directory number is executed. Accordingly, the network reports the detected event in a format and language that the subscriber or its device can recognize.

38 Claims, 9 Drawing Sheets

METHOD AND SYSTEM FOR REPORTING EVENTS IN TELECOMMUNICATION NETWORKS

BACKGROUND OF THE INVENTION

1. Field of the Invention

The present invention relates to telecommunication networks and, more particularly, to a method and system for reporting events to subscribers in telecommunication networks.

2. Background of the Art

Telecommunication networks use various signaling systems for establishing calls between subscribers. At times, however, the networks may detect certain states or events that would prevent the networks from establishing calls between subscribers. These events may include, for example, when a called directory number is out of service, network lines are busy or down, a switching node experiences a problem, etc. In such instances, the networks instead report the detected events to the subscribers by playing prerecorded audible messages.

Specifically, when a subscriber places a call to another subscriber in a network, a switching node local to the calling subscriber receives a call request from the calling subscriber's device. The switching node then sends a route request to a signaling node in the network to determine a route for the call. If the signaling node determines a route, the signaling node returns to the switching node the directory number of the next node in the network through which the call must be routed. Otherwise, if the signaling node detects that the call cannot be established or routed such as when the called subscriber's directory number is out of service, the signaling node returns an error code to the switching node. The switching node then notifies the subscriber that the requested call cannot be established by playing a prerecorded audible message corresponding to the error code.

Although audible messages may be sufficient for reporting events to subscribers who use plain ordinary telephone service (POTS) telephone sets, such messages are not universally recognizable by all subscriber devices. For example, consider a subscriber who uses a telecommunications device for the deaf (TDD) to place calls to other subscribers in the network. When the network plays an audible message to report an event, neither the subscriber nor the TDD device would be able to recognize the message. Similarly, an application running in a desktop computer for dialing into, for example, a local Internet Service Provider (ISP) system cannot recognize audible messages received from the network or present such messages in a form that is recognizable to a subscriber.

As yet another example, consider subscriber devices used in automotive telemetric or remote reading applications. In such applications, subscriber devices send and receive data from remote systems by automatically placing calls over the existing networks. However, since these subscriber devices cannot process the audible messages that are reported by the networks, they cannot provide the subscriber with informative information as to the cause of most communication failures. Furthermore, these subscriber devices cannot automatically take corrective actions in response to most communication failures. Corrective actions may include, for example, redialing a directory number when network lines are busy or dialing a different directory number when a previously dialed directory number is temporarily out of service. As the number of subscribers who use these and other devices that cannot process audible messages increases, the need for reporting network events in formats that subscriber devices can process grows accordingly.

Furthermore, even with respect to those subscribers who use audible devices such as, POTS telephone sets, to communicate over the existing networks, there is a need to provide audible messages in languages that subscribers can understand. For example, a Spanish speaking subscriber may wish to receive audible messages in Spanish, whereas a French speaking subscriber may wish to receive audible messages in French.

SUMMARY OF THE INVENTION

It is therefore desirable to have a method and system for reporting events in formats and languages that are recognizable by subscribers in telecommunication networks.

Methods and systems consistent with the present invention report network events to subscribers in a plurality of formats and languages depending upon the particular subscriber group to which a subscriber belongs. When an event is detected, such methods and systems identify a subscriber's group, determine a directory number associated with the identified group and the detected event, and report to the subscriber a message associated with the determined directory number.

In accordance with an embodiment of the invention, a switching node is configured with a trigger that designates a signaling node in the network for routing call requests received by the switching node from subscribers in the network. The designated signaling node is configured with a directory number mapping table that includes a plurality of predetermined directory numbers indexed according to events, which when detected are reported to the calling subscribers such as, when a subscriber's directory number is out of service, network lines are busy or out of service, etc. These predetermined directory numbers are further indexed according to subscriber groups in the network.

The predetermined directory numbers are selected so that they terminate at a message node such as, a messaging system, in the network, where a plurality of stored messages are associated with the predetermined directory numbers, respectively. These messages may be stored in a plurality of formats and languages such as, voice, data, telecommunications for the deaf (TDD), English, Spanish, etc. depending upon the particular subscriber groups in the network.

When a switching node receives a request for a call from a calling subscriber to a called subscriber, the switching node invokes the trigger configured therein to identify the signaling node designated for routing calls from the calling subscriber and sends a route request to the identified signaling node. While processing the route request, if the signaling node detects an event that should be reported to the calling subscriber, the signaling node identifies the subscriber group associated with the calling subscriber. The signaling node then selects a directory number from the directory number mapping table based on the detected event and the identified subscriber group and returns the selected directory number to the switching node. Based on the directory number received from the signaling node, the switching node establishes a call between the calling subscriber and the message node, where a message associated with the directory number is executed.

Accordingly, the network reports the detected event in a format and language that the calling subscriber or its device can recognize. As an illustration, when a calling subscriber dials a directory number and the network detects an event such as, an error that must be reported to the calling subscriber, that event is reported in a TDD format to a calling subscriber using a TDD device, whereas the same event is reported in a voice format to a calling subscriber using a POTS telephone set. Furthermore, events are reported in English to a calling subscriber whose subscriber group profile indicates that events should be reported in English, whereas the same events are reported in Spanish to a calling subscriber whose subscriber group profile indicates that events should be reported in Spanish.

BRIEF DESCRIPTION OF THE DRAWINGS

The foregoing summary and the following detailed description should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures.

DETAILED DESCRIPTION

The following description of embodiments of this invention refers to the accompanying drawings. Where appropriate, the same reference numbers in different drawings refer to the same or similar elements.

In accordance with an embodiment of the invention, a network is configured such that network events are reported to subscribers in a plurality of formats and languages depending upon the particular subscriber group to which a subscriber belongs. When a switching node in the network receives a call request from a subscriber, a trigger in the switching node is invoked to identify a designated signaling node for routing the call. The switching node then sends a route request to the signaling node. If during processing of the route request the signaling node detects an event that should be reported to the subscriber, the signaling node identifies the subscriber group associated with the subscriber. The signaling node then selects from a directory mapping table a directory number associated with the identified subscriber group and the detected event and returns the selected directory number to the switching node. Switching node then establishes the call to the message node, where a message associated with the determined directory number is executed.

Figure 1:
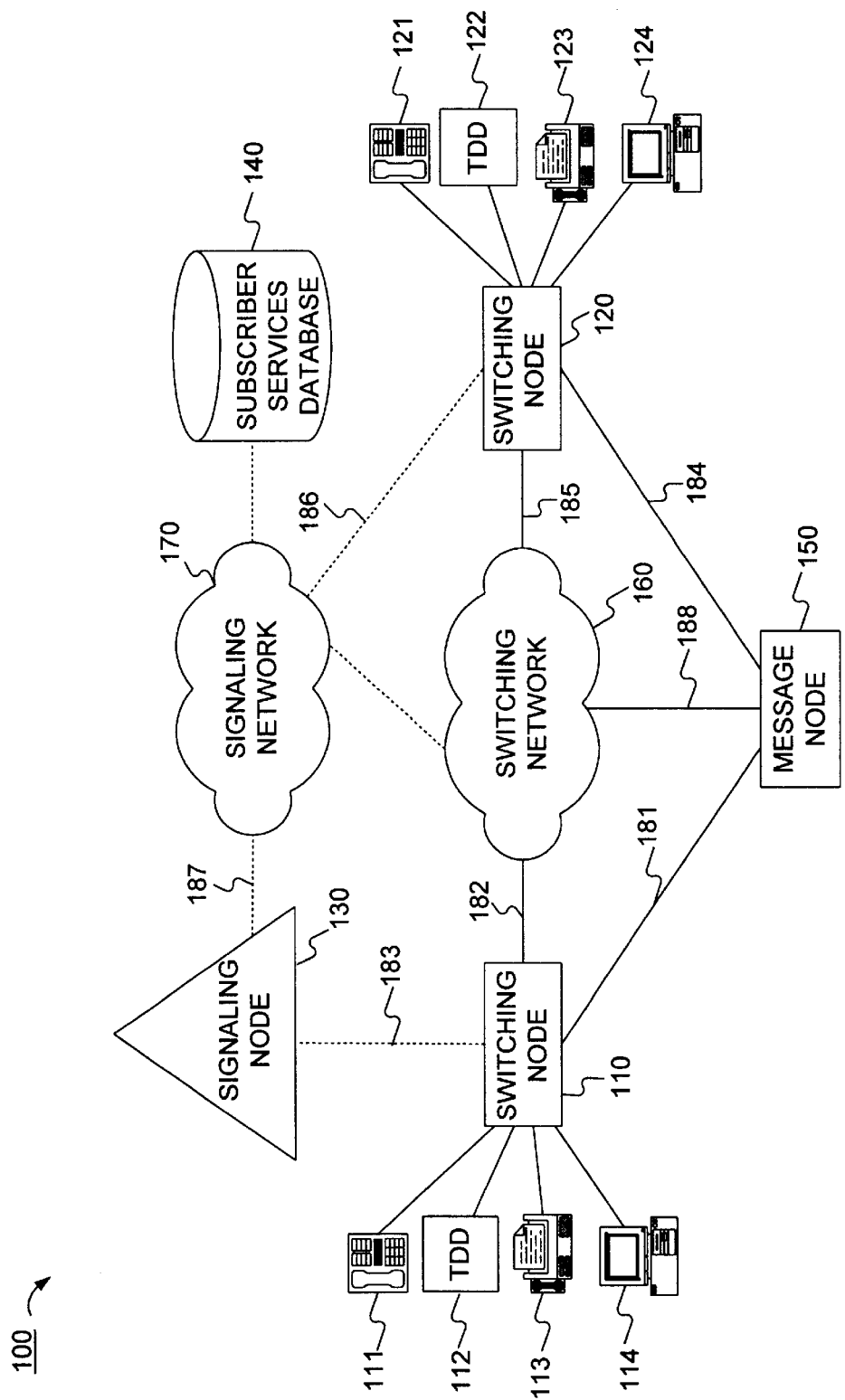
FIG. 1 is a block diagram of a telecommunications network, in accordance with methods and systems consistent with the invention.

FIG. 1 shows a block diagram of a telecommunications network 100, in accordance with methods and systems consistent with the invention. As shown, network 100 comprises switching nodes 110 and 120, a signaling node 130, a subscriber services database 140, a message node 150, a switching network 160, and a signaling network 170. Switching node 110 connects via links 181, 182, and 183 to message node 150, switching network 160, and signaling node 130, respectively. Links 181 and 182 include, for example, N lines $181_1$–$181_N$ and $182_1$–$182_N$ (not shown), respectively. Switching node 110 also connects via local loops to a telephone 111, telecommunications for the deaf (TDD) device 112, facsimile machine 113, and a desktop computer 114.

Switching node 110 may include, for example, a 5ESS™, DMS-100™ (or DMS-200™), GTD-5™, or an EWSD™ switching system manufactured by Lucent Technologies, Inc., Nortel Networks Corporation, AGCS, and Siemens, respectively. As explained below in detail, switching node 110 is configured to request routing information from signaling node 130 when switching node 110 receives call requests from telephone 111, TDD device 112, facsimile machine 113, and desktop computer 114.

Similarly, switching node 120 connects via links 184, 185, and 186 to message node 150, switching network 160, and signaling network 170, respectively. Switching node 120 also connects via local loops to a telephone 121, TDD device 122, facsimile machine 123, and a desktop computer 124.

Signaling node 130 interfaces subscriber services database 140 via signaling network 170. Signaling node 130 may include a Service Control Point (SCP) such as, AI-NET™, Integrated Service Control Point (ISCP™), or Service Builder™ equipment/software manufactured or provided by Lucent Technologies, Inc., Telcordia Technologies, Inc., and Nortel Networks Corporation, respectively.

Subscriber services database 140 stores information about subscriber services and may include, for example, a line information database (LIDB), call management services database (CMSDB), and/or business services database (BSDB). The LIDB, CMSDB, and BSDB are defined in Bellcore (now Telcordia Technologies, Inc.) publication TR-NWT-001244, "Supplemental Service Control Point (SCP)."

Message node 150 may include, for example, a messaging system, which includes messages in a plurality of formats such as, voice, data, and TDD, and in a plurality of languages such as, English, Spanish, French, etc. Alternatively, message node 150 may be a workstation, which includes a plurality of stored messages and a bank of modems for receiving calls from switching nodes 110 and 120 and switching network 160.

Switching network 160 and signaling network 170 may include, for example, a Public Switched Telephone Network (PSTN) and a Signaling System 7 (SS7) network, respectively.

Figure 2:
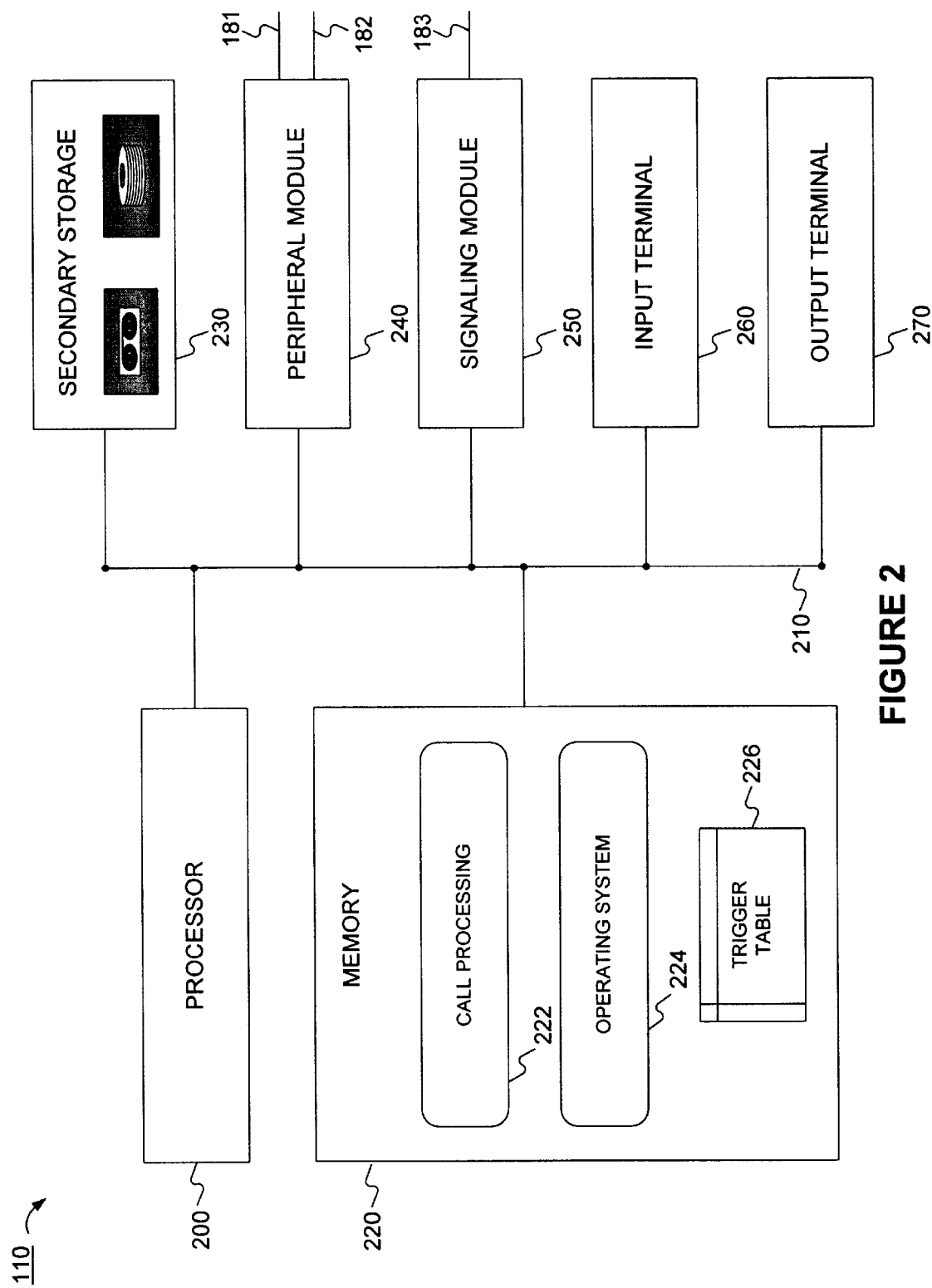
FIG. 2 is a block diagram of a switching node in a telecommunications network, in accordance with methods and systems consistent with the invention.

FIG. 2 is a block diagram of switching node 110, in accordance with methods and systems consistent with the invention. Switching node 110 comprises a processor 200, which connects via bus 210 to a memory 220, a secondary storage 230, a peripheral module 240, a signaling module 250, and input terminal 260, and an output terminal 270.

Memory 220 includes a call processing module 222, an operating system 224, and a trigger table 226. Call processing module 222 includes data and software executed by processor 200 for establishing, maintaining, and terminating calls between subscribers in network 100. Operating system 224 includes data and software executed by processor 200 for non-switching functions, which include, for example, task scheduling and processor interrupt handling. As explained below in detail, trigger table 226 includes entries that are used to intercept call requests in switching node 110 and to identify the associated signaling nodes such as, signaling node 130, for routing the requested calls in network 100.

Secondary storage 230 includes a computer readable medium such as a disk drive and a tape drive. From the tape drive, software and data may be loaded onto the disk drive, which can then be copied into memory 220. Similarly, software and data in memory 220 may be copied onto the disk drive, which can then be loaded onto the tape drive.

Peripheral interface module 240 interfaces with links 181 and 182, which connect switching node 110 to message node 150 and switching network 160, respectively.

Signaling interface module 250 transmits to and receives from signaling node 130 signaling information such as, Advanced Intelligent Network (AIN) messages. For example, signaling interface module 250 converts signaling information generated by call processing module 222 into AIN messages and transmits the messages to signaling node 130. Likewise, signaling interface module 250 receives AIN messages from signaling node 130 and converts the messages into an internal format for processing by call processing module 222.

Input terminal 260 may include an input device such as, a keyboard, and output terminal 270 may include a display device.

Figure 3:
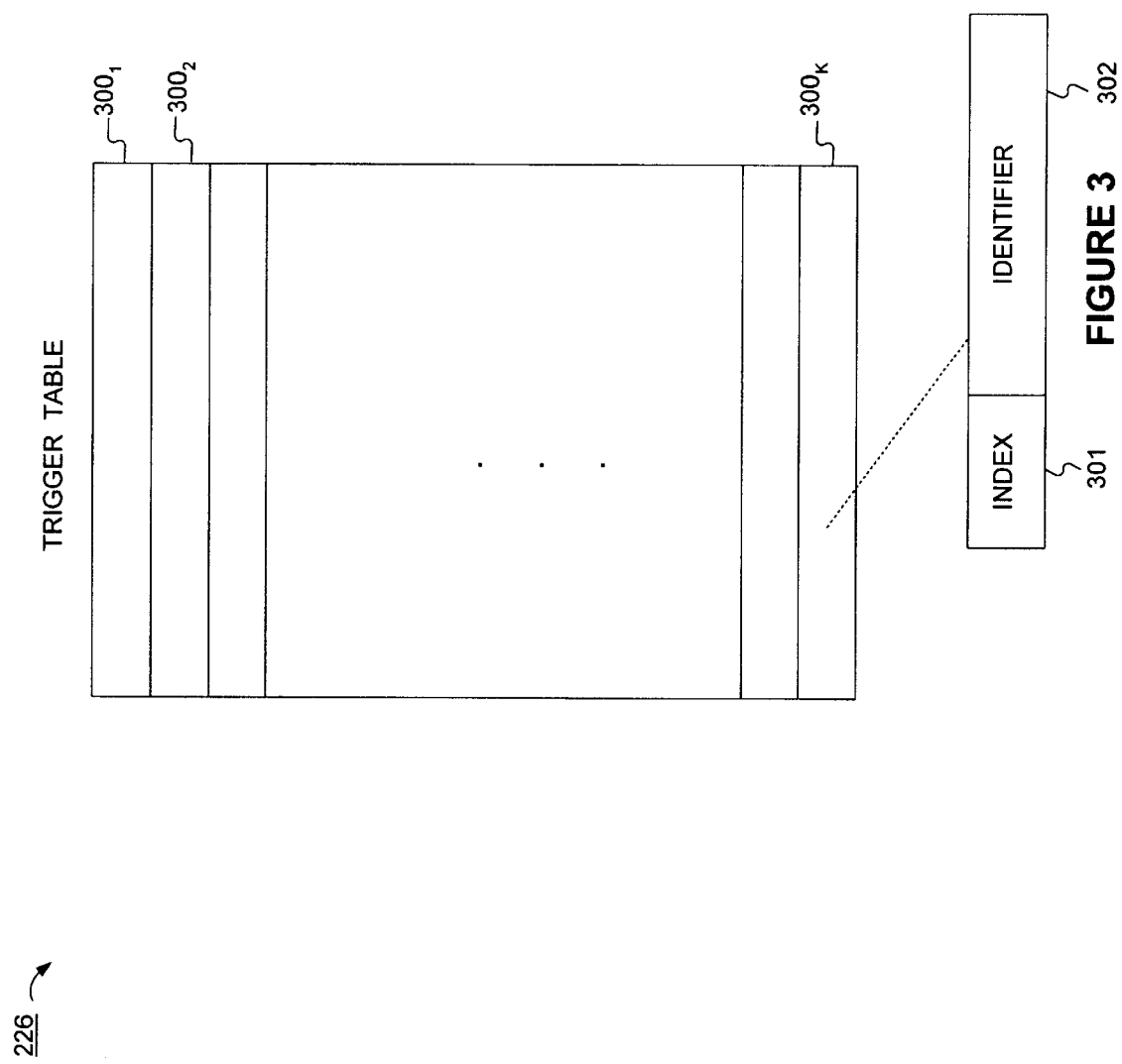
FIG. 3 is a block diagram of a trigger table in a switching node, in accordance with methods and systems consistent with the invention.

FIG. 3 is a block diagram of trigger table 226, in accordance with methods and systems consistent with the invention. Trigger table 226 includes K predetermined triggers shown as entries $300_1$–$300_K$, where each entry includes an index field 301 and an identifier field 302. In an embodiment where triggers $300_1$–$300_K$ are Public Office Dialing Plan (PODP) triggers, an index field 301 may include a 3, 6, or 10 digit string such as, an area code, an area code and an office code, or a directory number. PODP triggers are described in AIN 0.1 standards TR-NWT-001284: Advanced Intelligent Network (AIN) 0.1 Switching System Generic Requirements, Issue 1 (August 1992) and TR-NWT-001285: Advanced Intelligent Network (AIN) 0.1 Service Control Point (SCP) Application Protocol Interface Requirements, Issue 1 (August 1992), both of which are incorporated herein by reference.

Alternatively, in an embodiment where triggers $300_1$–$300_K$ are Specific Digit String (SDS) triggers, an index field 301 may include any sequence of digits. SDS triggers are described in AIN 0.2 standards GR-1298-CORE: AIN SSP, AINGR: Switching Systems (A Module Of AINGR, FR-15), Issue 4 (September 1997) and GR-1299-CORE: AINGR: Switch—Service Control Point (SCP)/Adjunct Interface (A Module Of AINGR, FR-15), Issue 4 (September 1997), both of which are incorporated herein by reference.

An identifier field 302 includes a numeric string that identifies a signaling node associated with a calling subscriber's directory number whose area code, area code and office code, or directory number matches the associated an index field 301 in trigger table 226. For example, trigger table 226 may be configured to include a trigger entry $300_K$, where index field $301_K$ includes the area code associated with telephone 111 and identifier field $302_K$ includes a translation type/global title address (TT/GTA) associated with signaling node 130. The TT/GTA may then be communicated to a signaling transfer point (STP) in network 100 for determining a point code associated with signaling node 130. Alternatively, identifier field $302_K$ may include a point code associated with signaling node 130, which may be used by switching node 110 to directly identify signaling node 130.

Figure 4:
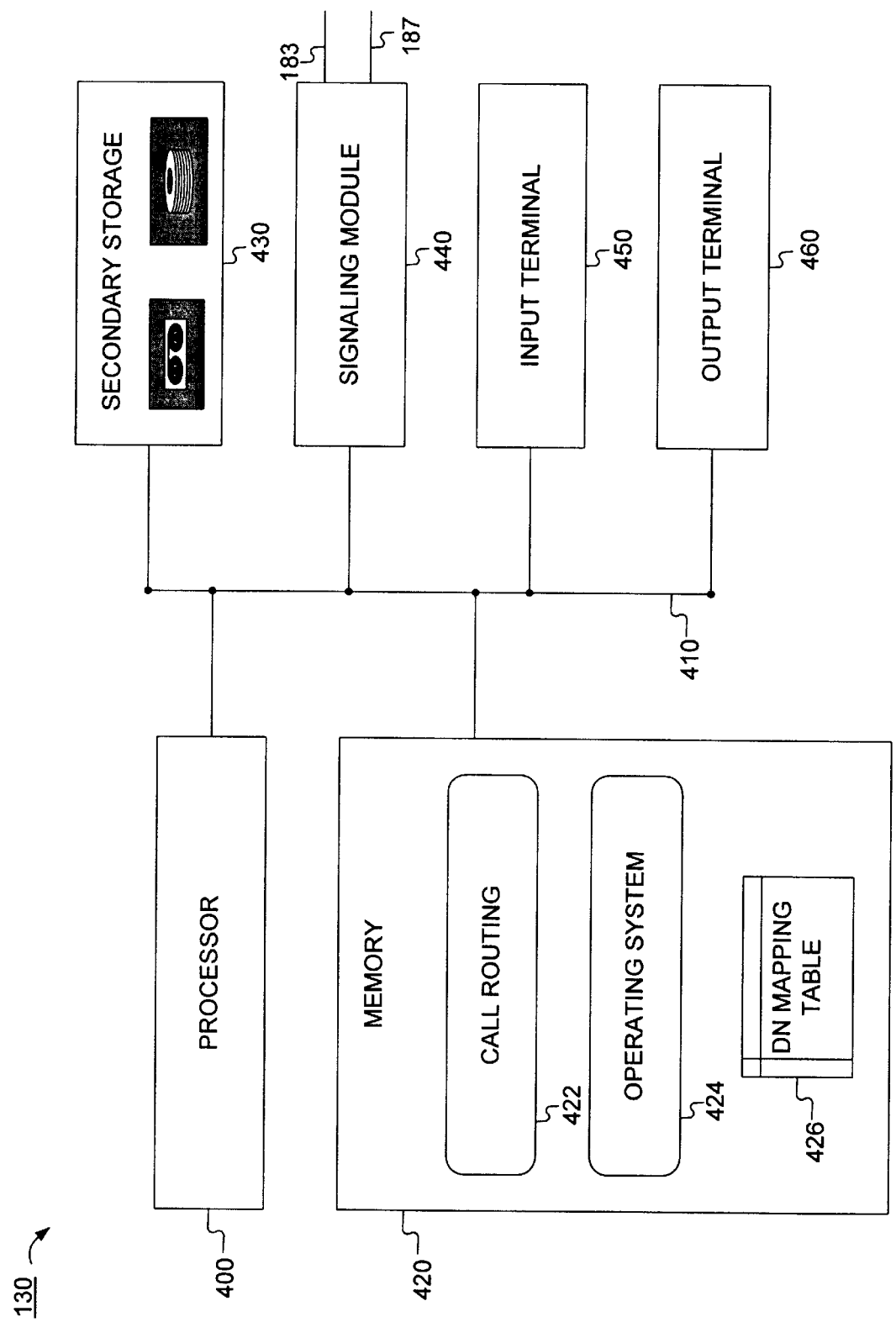
FIG. 4 is a block diagram of a signaling node in a telecommunications network, in accordance with methods and systems consistent with the invention.

FIG. 4 is a block diagram of signaling node 130, in accordance with methods and systems consistent with the invention. Signaling node 130 comprises a processor 400, which connects via a bus 410 to a memory 420, a secondary storage 430, a signaling interface module 440, an input terminal 450, and an output terminal 460.

Memory 420 includes a call routing module 422, an operating system 424, and a directory number (DN) mapping table 426. Call routing module 422 includes data and software executed by processor 400 for communicating with subscriber services database 140 via signaling network 170.

Secondary storage 430 includes a computer readable medium such as a disk drive and a tape drive. From the tape drive, software and data may be loaded onto the disk drive, which can then be copied into memory 420. Similarly, software and data in memory 420 may be copied onto the disk drive, which can then be loaded onto the tape drive.

Signaling interface module 440 transmits to and receives from switching node 110 and signaling network 170 signaling information such as, AIN messages. For example, signaling interface module 440 converts signaling information generated by call routing module 422 into AIN messages and transmits the messages to switching node 110 and signaling network 170. Likewise, signaling interface module 440 receives AIN messages from switching node 110 and signaling network 170 and converts the messages into an internal format for processing by call routing module 422.

Input terminal 450 may include an input device such as, a keyboard, and output terminal 460 may include a display device.

Figure 5:
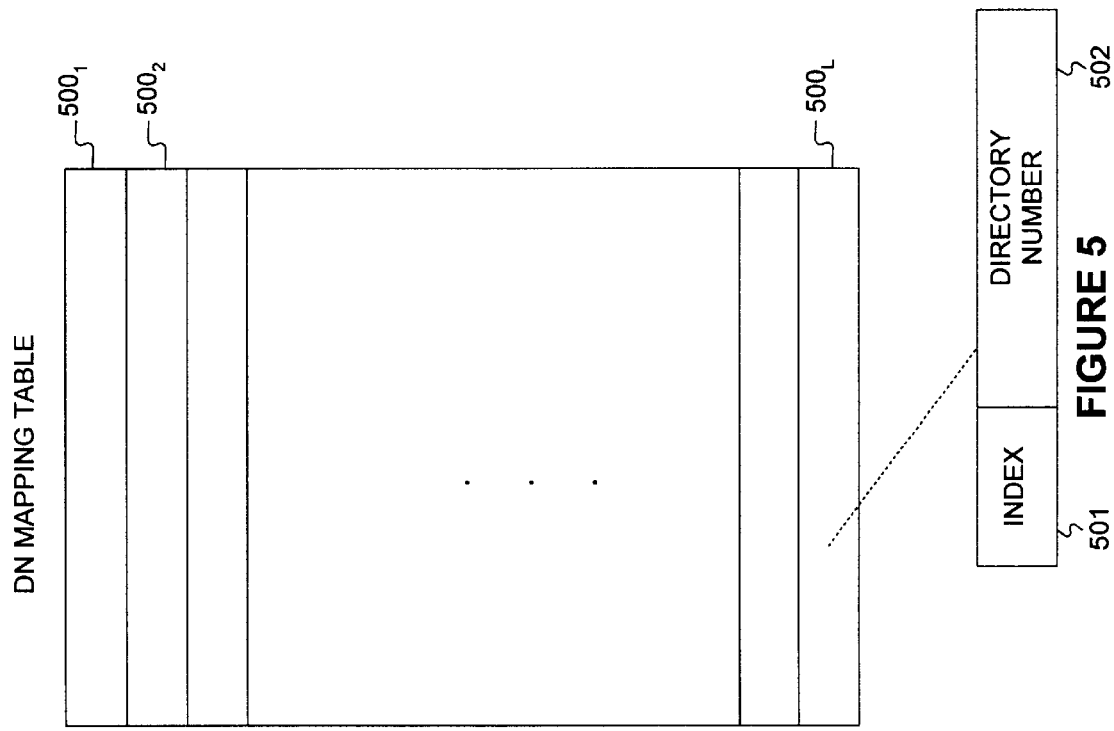
FIG. 5 is a block diagram of a directory number mapping table in a signaling node, in accordance with methods and systems consistent with the invention.

FIG. 5 is a block diagram of DN mapping table 426, in accordance with methods and systems consistent with the invention. DN mapping table 426 includes L entries $500_1$–$500_L$, where each entry includes an index field 501 and a directory number field 502. An index field 501 may include, for example, an event code and a subscriber group identifier, which identify an event and a subscriber group, respectively. A directory number field 502 includes a directory number that terminates at message node 150.

In one embodiment, an administrator may configure DN mapping table 426 such that each event code and subscriber group identifier combination is associated with a unique directory number. The administrator may select each event code and subscriber group identifier combination so that subscriber devices namely, telephone 111, TDD device 112, and desktop computer 114, each receives from message node 150 messages that can be processed by the subscriber devices.

Accordingly, when a subscriber dials a directory number and network 100 detects an event such as, an error in network 100 that must be reported to the subscriber, that event is reported in a TDD format to a subscriber using TDD device 112, whereas the same event is reported in a voice format to a subscriber using telephone 111. Similarly, events are reported in English to a subscriber whose subscriber group profile indicates that events should be reported in English, whereas the same events are reported in Spanish to a subscriber whose subscriber group profile indicates that events should be reported in Spanish.

As shown below in detail, the administrator may configure message node 150 with messages that are in a plurality of formats and languages and correspond to the directory numbers that appears in entries $500_1$–$500_L$ in DN mapping table 426. Thus, network 100 is configured to selectively report messages in different formats and languages, depending upon the particular subscriber group associated with a calling subscriber and the particular event detected by network 100.

Figure 6:
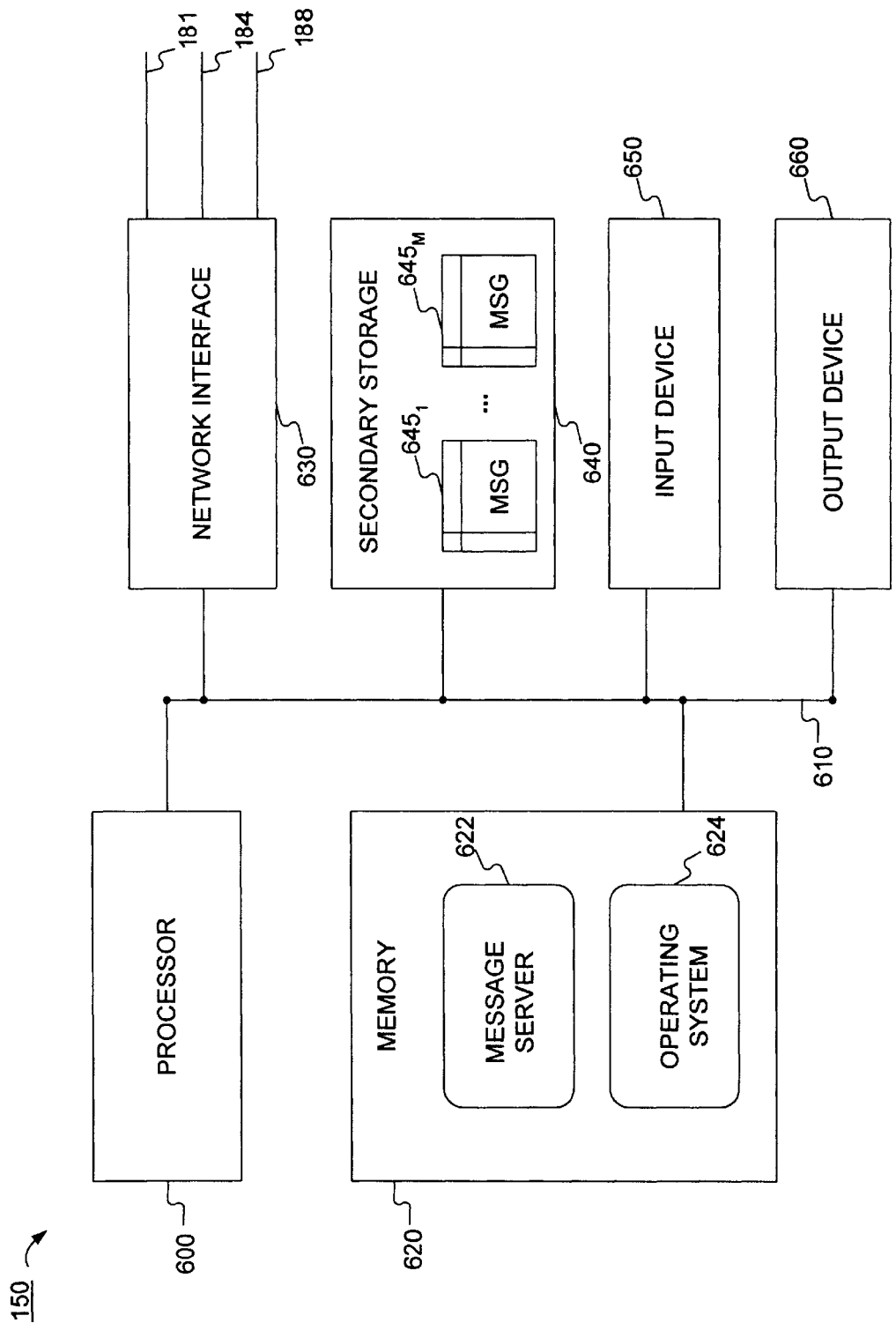
FIG. 6 is a block diagram of a message node in a telecommunications network, in accordance with methods and systems consistent with the invention.

FIG. 6 is a block diagram of message node 150, in accordance with methods and systems consistent with the invention. Message node 150 comprises a processor 600, which connects via bus 610 to a memory 620, a network interface module 630, a secondary storage 640, an input device 650, and an output device 660. Message node 150 may include a messaging system such as, Octel 250 manufactured by Lucent Technologies. Alternatively, message node 150 may include a computer that includes a VFX/PCI board manufactured by Dialogic, an Intel Company. Each port in the VFX/PCI board may be connected to a line in links 181, 184, and 188.

Memory 620 includes a message server 622 and an operating system 624. Message server 622 includes data and software executed by processor 600 for executing M messages $645_1$–$645_M$ stored in secondary storage 640. Operating system 624 includes data and software executed by processor 600 for managing tasks and processor interrupts.

In response to an interrupt initiated by network interface module 630, message server 622 loads into memory 620 one of messages $645_1$–$645_M$ that corresponds to the port on which a call is detected in network interface module 630. Alternatively, in an embodiment where links 181, 184, and 188 are provisioned as Direct Inward Dialing (DID) links, message server 622 loads into memory 620 one of messages $645_1$–$645_M$ that corresponds to a sequence of digits (e.g. a portion or all digits) of a directory number included in the detected call.

Message server 622 then executes or plays the message loaded into memory 620. After executing or playing the message, message server 622 signals network interface module 630 to terminate the call.

Secondary storage 640 stores messages $645_1$–$645_M$ in a plurality of formats such as, voice, data, TDD, and in a plurality of languages such as, English, Spanish, French, etc. An administrator stores messages $645_1$–$645_M$ in secondary storage 640 such that each message is associated with a unique port in network interface module 630.

Input device 650 may include an input device such as, a keyboard, and output device 660 may include a display device.

Figure 7:
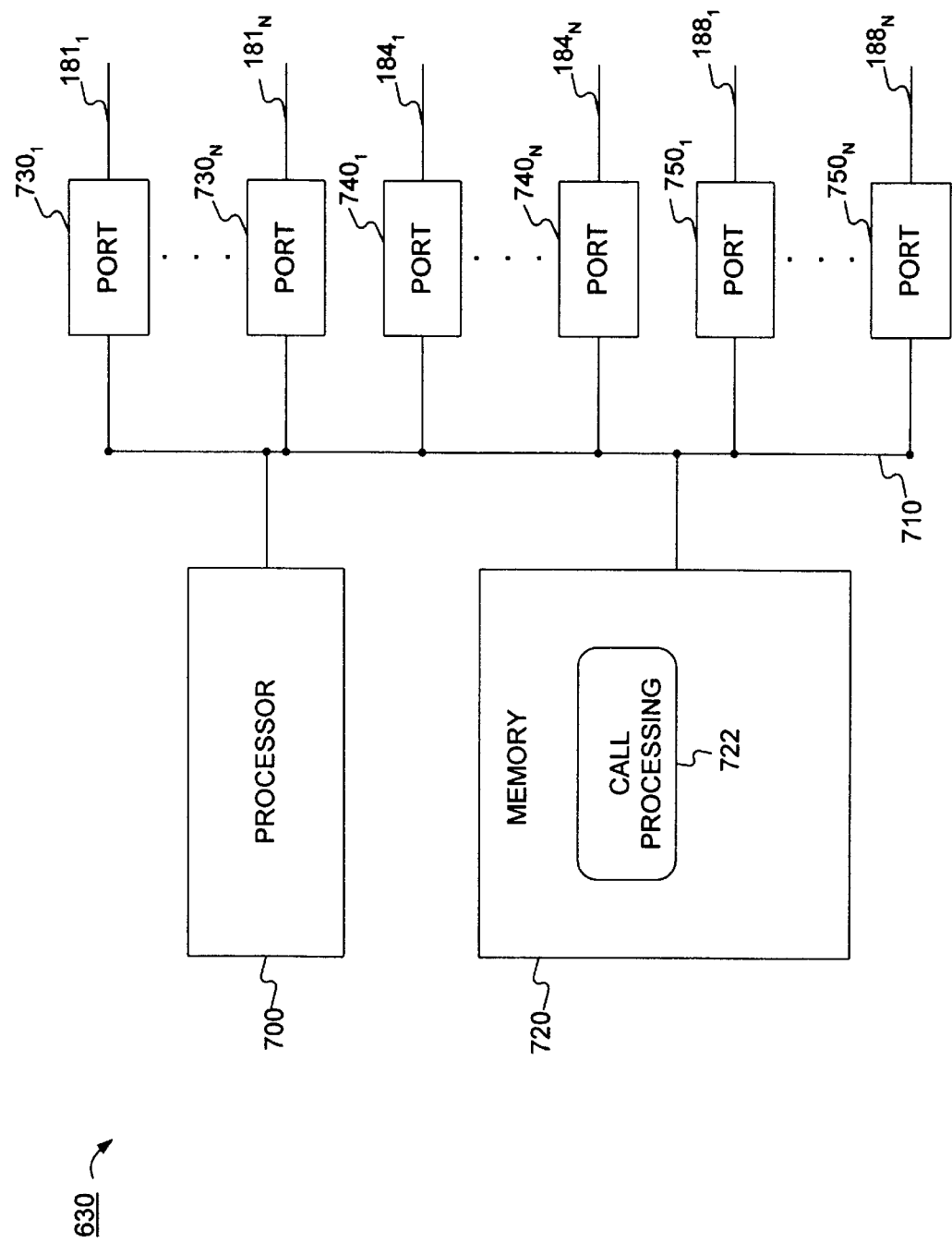
FIG. 7 is a block diagram of a network interface module in a message node, in accordance with methods and systems consistent with the invention.

Network interface module 630, which connects to links 181, 184, and 188, includes hardware and software for processing calls that arrive on links 181, 184, and 188. FIG. 7 is a block diagram of network interface module 630, in accordance with methods and systems consistent with the invention. Network interface module 630 includes a processor 700, which connects via bus 710 to a memory 720, 3×N ports $730_1$–$730_N$, $740_1$–$740_N$, and $750_1$–$750_N$. Ports $730_1$–$730_N$ connect to lines $181_1$–$181_N$, respectively; ports $740_1$–$740_N$ connect to lines $184_1$–$184_N$, respectively; and ports $750_1$–$750_N$ connect to lines $188_1$–$188_N$, respectively.

Alternatively, links 181, 184, and 188 may be provisioned as DID links such that calls detected at ports $730_1$–$730_N$, $740_1$–$740_N$, and $750_1$–$750_N$ include a portion (e.g., the last few digits) or all of the digits of the directory numbers associated with the calls.

Memory 720 includes a call processing module 722, which includes data and software executed by processor 700 for processing calls that arrive on lines $181_1$–$181_N$, $184_1$–$184_N$, and $188_1$–$188_N$. Call processing module 722 monitors ports $730_1$–$730_N$, $740_1$–$740_N$, and $750_1$–$750_N$, detects calls that arrive on lines $181_1$–$181_N$, $184_1$–$184_N$, and $188_1$–$188_N$, and transmits an off-hook signal to network 100 when a call is detected on any of the lines $181_1$–$188_N$, $184_1$–$184_N$, and $188_1$–$188_N$. When a call is detected, call processing module 722 initiates an interrupt in processor 600 to notify message server 622 as to the port on which a call is detected.

Figure 8:
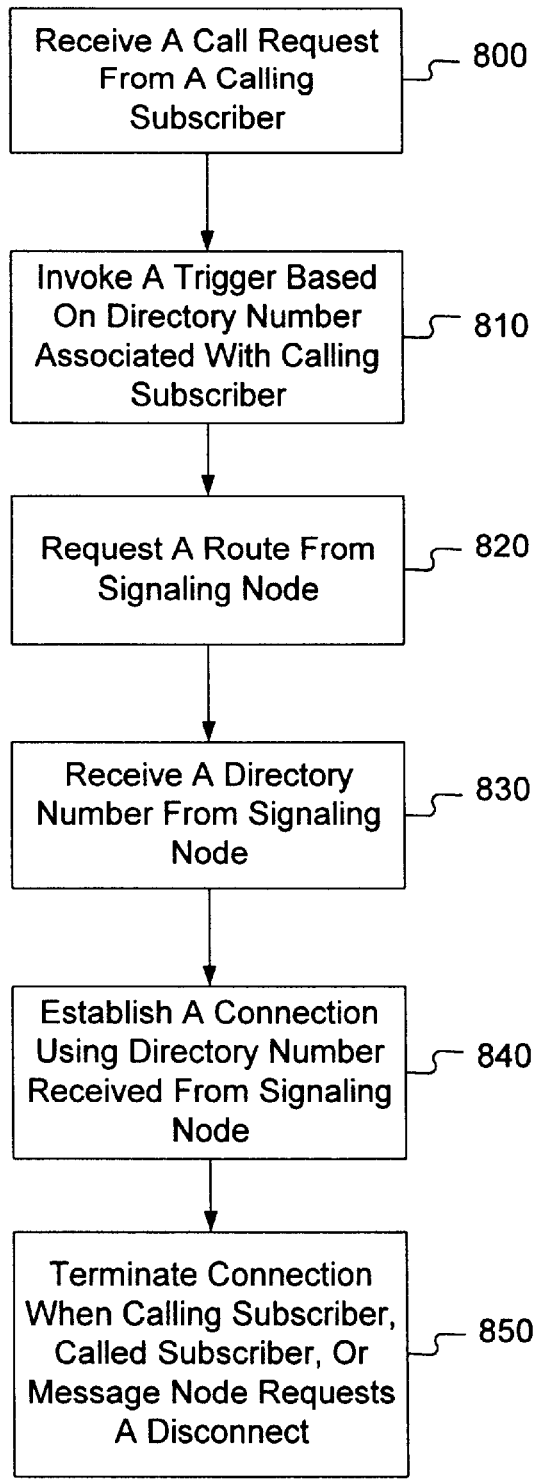
FIG. 8 is a flow chart of the steps performed by a call processing module in a switching node, in accordance with methods and systems consistent with the invention.

FIG. 8 is a flow chart of the steps performed by call processing module 222 in switching node 110, in accordance with methods and systems consistent with the invention. In one embodiment, a calling subscriber dials a directory number from, for example, telephone 111 (shown in FIG. 1) to a called subscriber that uses telephone 122. As a result, call processing module 222 receives a call request from telephone 111 (step 800). Call processing module 222 then invokes a trigger configured in trigger table 226 based on the directory number of the calling subscriber (step 810). For example, call processing module 222 invokes a trigger whose index matches a sequence of digits in the calling subscriber's directory number such as, the area code, a combination of the area code and office code, the calling subscriber's full directory number, or any other sequence of digits.

Once invoked, the trigger identifies a signaling node, for example signaling node 130, for routing the calling subscriber's call. Accordingly, call processing module 222 requests a route from signaling node 130 by sending, for example, an AIN info_analyze message whose parameters include the called subscriber's directory number and the calling subscriber's directory number (step 820). Call processing module 222 then suspends further processing of the call until it receives a response from signaling node 130 (step 830).

The response from signaling node 130 may include, for example, an AIN info_analyze_response message that includes as one of its parameters a directory number to which call processing module 222 must route the call. If signaling node 130 detects an event that must be reported to the calling subscriber such as, when the called subscriber's directory number is out of service, network 100 lines are busy, or a segment of network 100 is down, signaling node 130 returns in the info_analyze_response message a directory number that terminates at message node 150. Otherwise, signaling node 130 returns the directory number of the next node in network 100 that must process the call request in order to establish the call between calling subscriber telephone 111 and called subscriber telephone 121.

Call processing module 222 then establishes a call using the directory number received from signaling node 130 (step 840). If the directory number terminates at message node 150, message node 150 answers the call and executes or plays a message associated with that directory number. Finally, call processing module 222 terminates the call when the calling subscriber telephone 111 or message node 150 requests a disconnect (step 850).

Figure 9:
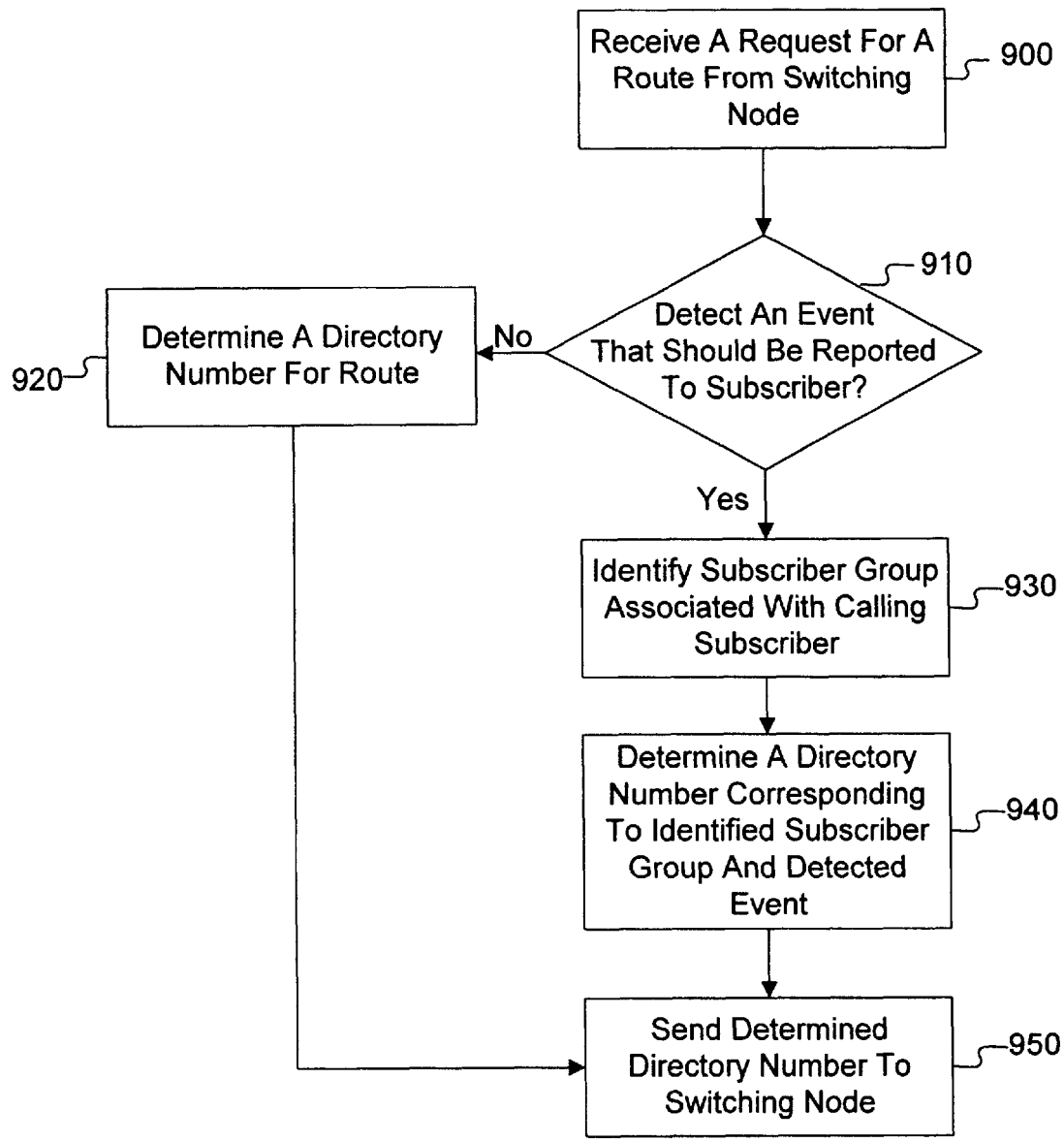
FIG. 9 is a flow chart of the steps performed by a call routing module in a signaling node, in accordance with methods and systems consistent with the invention.

FIG. 9 is a flow chart of the steps performed by a call routing module 422 in signaling node 130, in accordance with methods and systems consistent with the invention. When the calling subscriber dials a directory number from telephone 111 to the called subscriber at telephone 122, call routing module 422 receives from switching node 110 a request for a route from the calling subscriber to the called subscriber (step 900). For example, call routing module 422 may receive an AIN info_analyze message whose parameters include the called subscriber's directory number and the calling subscriber's directory number.

While processing the request, call routing module 422 determines whether network 100 can establish the call (step 910). If call routing module 422 determines that network 100 can establish the call, call routing module 422 determines the directory number of the next node in network 100 that must process the call (step 920). Call routing module 422 then sends to switching node 110 the determined directory number in an AIN info_analyze_response message (step 950).

If call routing module 422 determines that network 100 cannot establish the call or detects an event that must be reported to the calling subscriber such as, when the called subscriber's directory number is out of service or network 100 links are busy, call routing module 422 determines the event code associated with that event. Call routing module 422 then queries subscriber service database 140, which may include, for example, a LIDB database, to determine the subscriber group identifier associated with the calling subscriber (step 930).

After determining the subscriber group identifier of the calling subscriber, call routing module 422 selects from DN mapping table 426 an entry whose index field 501 matches, for example, the event code and the subscriber group identifier (step 940). Call routing module 422 then reads the directory number in the directory number field 502 of the selected entry and sends the directory number to switching node 10 in an AIN info_analyze_response message (step 950). Accordingly, by selecting from DN mapping table 426 a predetermined directory number that terminates at message node 150 and that is based on the subscriber group identifier of the calling subscriber and the event code associated with the detected event, signaling node 130 has identified an appropriate message in message node 150 for reporting the detected event to the calling subscriber.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for reporting events in a network based on messages that are available in a plurality of formats, said method comprising the steps of:

identifying a group associated with a calling subscriber in response to a trigger that is invoked when an event that indicates an error in routing a call from the calling subscriber is detected, wherein the group receives messages through the network in one of the plurality of formats;

determining a directory number associated with the identified group and the detected event; and reporting to the calling subscriber a message associated with the directory number in the format of the identified group.

2. The method of claim 1, wherein the identifying step comprises the step of:

identifying a subscriber group associated with the calling subscriber when the event is detected.

3. The method of claim 1, wherein the identifying step comprises the step of:

identifying the group when the detected event is associated with a call that is requested by the calling subscriber and that cannot be established in the network.

4. The method of claim 1, wherein the identifying step comprises the step of:

retrieving from a subscriber services database in the network a group identifier associated with the calling subscriber.

5. The method of claim 1, wherein the determining step comprises the step of:

selecting the directory number from a table that includes one or more predetermined directory numbers indexed by event identifiers and group identifiers.

6. The method of claim 1, wherein the reporting step comprises the step of:

establishing a call from the calling subscriber to a message node in the network using the determined directory number.

7. The method of claim 1, wherein the reporting step comprises the step of:

executing the message in a voice format.

8. The method of claim 1, wherein the reporting step comprises the step of:

executing the message in a telecommunication device for deaf (TDD) format.

9. The method of claim 1, wherein the reporting step comprises the step of:

executing the message in a data format.

10. A method for reporting events that indicate at least one error with calls requested by calling subscribers in a network based on messages that are available in a plurality of formats, wherein the calling subscribers are members of subscriber groups and each of the subscriber groups receives messages in one of the plurality of formats, said method comprising the steps of:

associating one or more directory numbers with the events and the subscriber groups;

storing, in a message node in the network, messages corresponding to the associated directory numbers in a plurality of formats; and establishing calls to the message node for providing the stored messages in formats respectively corresponding to the subscriber groups of the calling subscribers using at least one of said associated one or more directory numbers when the network detects the events that indicate at least one error in establishing calls from the calling subscribers and when the network determines the subscriber groups for the calling subscribers in response to a trigger.

11. The method of claim 10, wherein the storing step comprises the step of:

storing the messages in a plurality of predetermined formats.

12. The method of claim 10, wherein the storing step comprises the step of:
storing the messages in a plurality of predetermined languages.

13. The method of claim 10, wherein the establishing step comprises the step of:
establishing the calls to the message node when a signaling node in the network detects the events.

14. The method of claim 10, wherein the establishing step comprises the step of:
requesting a route from a signaling node in the network when one of the subscribers requests a call to another one of the subscribers.

15. The method of claim 10, wherein the establishing step comprises the step of:
requesting a route from a signaling node in the network when said one of the calling subscribers requests a call to another one of the subscribers.

16. The method of claim 10, wherein the establishing step comprises the step of:
invoking the trigger to identify a signaling node in the network when said calling subscribers requests a call to another one of the subscribers.

17. A method for reporting events associated with calls requested in a network based on messages that are available in a plurality of formats, wherein the network comprises a switching node and a message node, said method comprising the steps of:
receiving, at the switching node, a request for establishing a call from a first subscriber to a second subscriber in the network;
identifying a signaling node in the network for routing the call;
receiving from the identified signaling node a first directory number for the message node when a trigger is invoked in response to an event that indicates an error associated with the call;
determining a group associated with the first subscriber in response to the trigger, wherein the group receives messages through the network in one of the plurality of formats;
establishing the call from the first subscriber to the message node using the first directory number; and
sending from the message node a message associated with the event in the format that corresponds to the group of the first subscriber.

18. The method of claim 17, further comprising the step of:
terminating the call established from the first subscriber to the message node when a request for disconnect is received from the first subscriber or the message node.

19. The method of claim 17, wherein the identifying step comprises the step of:
invoking the trigger that is indexed based on an area code in the second directory number of the first subscriber.

20. The method of claim 17, wherein the identifying step comprises the step of:
invoking the trigger that is indexed based on an area code and an office code in the second directory number of the first subscriber.

21. A method for reporting events associated with calls requested in a network based on messages that are available in a plurality of formats, wherein the network comprises a switching node, a signaling node, and a message node, said method comprising the steps of:
receiving, at the signaling node, a request from the switching node for routing a call from a first subscriber to a second subscriber in the network;
identifying a group associated with the first subscriber in response to a trigger that is invoked when an event that indicates an error associated with the call is detected, wherein the group receives messages through the network in one of the plurality of formats;
selecting a directory number based on the identified group; and
sending the second directory number to the switching node such that the call is established from the first subscriber to the message node and a message associated with the detected event is reported to the first subscriber in the format of the identified group.

22. The method of claim 21, wherein the selecting step comprises the step of:
selecting the second directory number from a plurality of predetermined directory numbers that are indexed by event identifiers and group identifiers.

23. A switching node, comprising:
a memory including
a structure for identifying a signaling node in a network when the switching node receives a request for establishing a call from a first subscriber to a second subscriber in the network and for including a trigger that is invoked when an event that indicates an error associated with the call is detected; and
code for establishing the call from the first subscriber to a message node in the network when the event associated with the call is detected such that a message associated with the detected event is reported to the first subscriber in a format of a group associated with the first subscriber; and
a processor for executing the code.

24. The switching node of claim 23, wherein the trigger is indexed by an area code in the directory number of the first subscriber.

25. The switching node of claim 23, wherein the trigger is indexed by an area code and an office code in the directory number of the first subscriber.

26. A signaling node, comprising:
a memory including
a structure for storing predetermined directory numbers associated with events that indicate at least one error and groups in a network, wherein the predetermined directory numbers correspond, respectively, to messages stored in a plurality of formats in a message node in the network and wherein each of the groups receives the messages in one of the plurality of formats; and
code for detecting at least one of the events when a calling subscriber requests a call to another subscriber, for invoking a trigger, for identifying a group associated with the calling subscriber based on the trigger, and for selecting one of the stored predetermined directory numbers based on the detected event and the identified group such that messages corresponding to the selected predetermined directory numbers are reported to the calling subscriber in a format of the identified group; and
a processor for executing the code.

27. A message node, comprising:
a storage module for storing messages in a plurality of formats, the messages respectively associated with predetermined directory numbers that correspond to events that indicate an error in a network and correspond to groups associated with subscribers, wherein each of the groups receives messages through the network in one of the plurality of formats;

a memory including code for playing one of the messages in a format of a group associated with calling subscribers when the network detects at least one of the events based on a trigger and code for establishing the call to one of the predetermined directory numbers; and a processor for executing the code.

28. The message node of claim 27, wherein the messages are stored in a plurality of formats.

29. The message node of claim 27, wherein at least one of the messages is stored in a voice format.

30. The message node of claim 27, wherein at least one of the messages is stored in a telecommunications for deaf (TDD) format.

31. The message node of claim 27, wherein at least one of the messages is stored in a data format.

32. The message node of claim 27, wherein the messages are stored in a plurality of languages.

33. A computer-readable medium capable of configuring a computer to perform a method for reporting events in a network based on messages that are available in a plurality of formats, said method comprising the steps of:

receiving a request for establishing a call from a first subscriber to a second subscriber in the network, wherein the first subscriber is associated with a group that receives messages in one of the plurality of formats;

requesting a route from a signaling node in the network;

receiving from the signaling node a directory number for a message node in response to a trigger that is invoked based on an event that indicates an error associated with the call;

determining the group associated with the first subscriber in response to the trigger; and establishing the call from the first subscriber to the message node in the network using the directory number such that a message associated with the event is reported in the format of the group associated with the first subscriber.

34. A computer-readable medium capable of configuring a computer to perform a method for reporting events associated with calls requested in a network based on messages that are available in a plurality of formats, said method comprising the steps of:

receiving a request from a switching node in the network for routing a call from a first subscriber to a second subscriber in the network;

identifying a group associated with the first subscriber based on a trigger when an event that indicates an error is detected in the network, wherein the group receives messages in one of the plurality of formats;

selecting a second directory number based on the identified group and the detected event; and sending the selected second directory number to the switching node such that the call is established from the first subscriber to a message node in the network and a message associated with the detected event is reported to the first subscriber in a format of the identified group.

35. A method for reporting events in a network to subscribers based on messages that are available in a plurality of formats, said method comprising the steps of:

identifying groups associated with calling subscribers based on triggers when events that indicate at least one error are detected in the network, wherein each of the groups receive messages through the network in one of the plurality of formats; and reporting to the calling subscribers messages in formats corresponding to the identified groups of the respective calling subscribers based on the detected events.

36. The method of claim 35, wherein the reporting step comprises the step of:

reporting the messages in a plurality of languages based on the identified groups and the detected events, respectively.

37. The method of claim 1, wherein the identifying step comprises the step of:

invoking the trigger based on a table that indexes the trigger by a variable number of digits in a directory number of the calling subscriber.

38. The switching node of claims 23, wherein the structure includes a trigger that is indexed by a variable number of digits in a directory number of the first subscriber.

* * * * *